Dec. 13, 1938.  P. WANGEMANN  2,140,343
CIRCUIT-BREAKER FOR REGULATING THE INTENSITY
OF AND RECTIFYING ELECTRIC CURRENTS
Original Filed Dec. 27, 1929
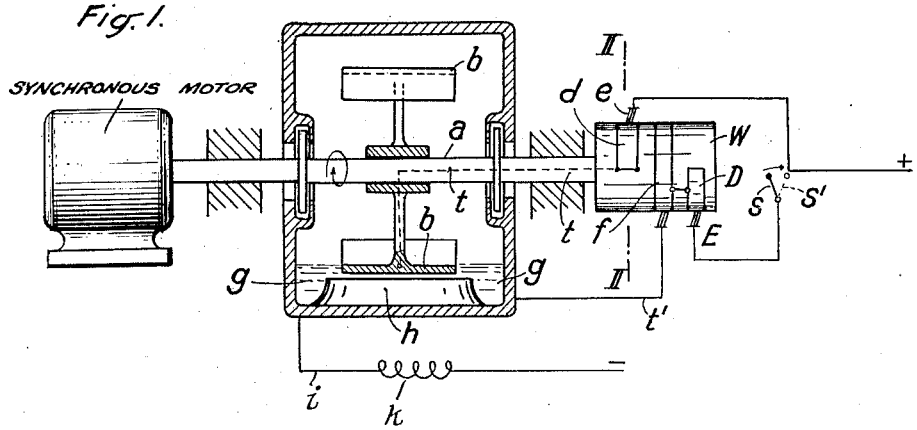
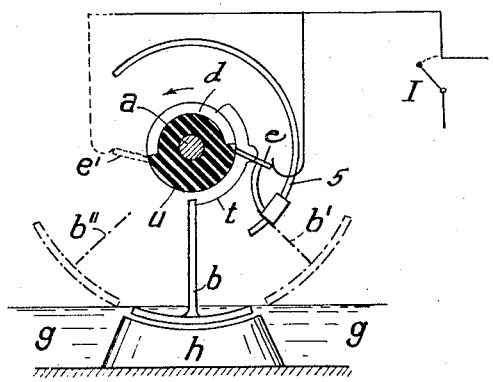
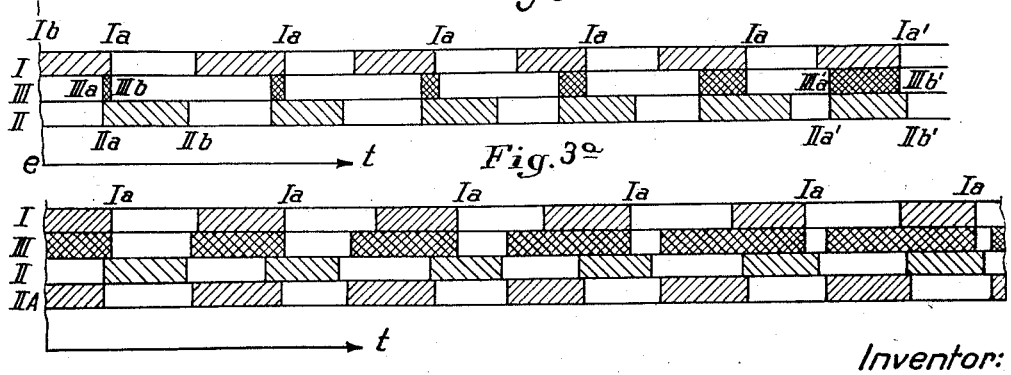
Inventor:
P. Wangemann Patented Dec. 13, 1938

2,140,343

UNITED STATES PATENT OFFICE 2,140,343

CIRCUIT-BREAKER FOR REGULATING THE INTENSITY OF AND RECTIFYING ELECTRIC CURRENTS

Paul Wangemann, New York, N. Y.

Application December 27, 1929, Serial No. 416,937
Renewed November 16, 1937. In Germany
January 4, 1929

4 Claims. (Cl. 200—32)

The present invention relates to interrupters for electric currents. The invention has for its object to provide an interrupter by which it is possible to switch on and off currents any number of times within a given period of time so that it is possible to convert alternating current into direct current and to regulate the intensity of either direct or alternating passing through the apparatus. The interrupter according to the invention is, therefore, a combination of a rectifier and a regulating apparatus.

The invention consists essentially of two synchronously rotating contactors, a metallic or mechanical contactor and an electrolytic contactor or break point. The electrolytic break point makes contact between an electrode and an electrolyte and its purpose is to interrupt the current in such manner as to absolutely avoid the formation of sparks. According to one mode of use of the invention, the current can only flow when the metallic and electrolytic contacts connected in series are simultaneously closed. If either of the contacts is opened the flow of current is interrupted. To ensure against sparking, the electrolytic break point is opened while the metallic break point is closed.

The metallic break point consists of a slip ring provided with a brush. If the period of closure of the circuit is fixed, the brush may be also fixed, but if the slip ring is to serve to regulate the period of closure of the circuit the brush is adjustable. When a second metallic contactor is connected in the main circuit in parallel to the electrolyte and the first mentioned metallic contactor, it carries the current during the greater part of the circuit closing period so that the current does not pass exclusively through the electrolyte throughout the entire period. Immediately prior to the interruption of the current, the latter passes only through the electrolyte and thus the interruption of the flow of current occurs at the electrolyte break point thereby avoiding sparking.

The first mentioned mechanical contactor having a movable brush and connected in series with the electrolyte break point has for its purpose to vary the circuit closure period for regulating the current by relative displacement of the brush of the mechanical contact with respect to the electrolytic contact. The current intensity is zero if the ratio of the current interruption period to the circuit closing period is zero. If the ratio of the period of interruption to the period of circuit closure is as 1:1, the average current passed is one-half of the total.

If the circuit closure period is increased and the interruption period shortened, the average current increases from one-half to full current intensity. In this way the apparatus can be used for regulating the intensity of current, for instance for starting motors.

According to the present invention the ordinary losses which inevitably occur in other apparatus for rectifying and regulating current are greatly reduced so that the efficiency of the improved rectifier is extremely high.

A constructional form of the present invention is shown in the accompanying drawing, in which:

Figure 1 shows an electrolyte-circuit-breaker partly in axial section.

Figure 2 is a side-view of the slip-ring contact, in which the electrodes are shown diagrammatically; and Figures 3 and 3a are diagrams of circuit closing and current interrupting periods dependent on the displacement of brushes relative to the partial slip-rings.

In Figure 1, $a$ designates the shaft of the rotating electrode $b$, dipping into the electrolyte $g$ and emerging from the same, while $h$ is the stationary counter-electrode. The electrode $b$ and the electrolyte $g$ form a metal to electrolyte break point. The electrode-shaft $a$ supports an approximately semi-circular or partial slip-ring $d$, on which the adjustable brush $e$ engages and a second semi-circular or partial slip-ring D, engaging the adjustable brush E. A suitable form of holder 5 for adjustably supporting the brushes $e$ and E is shown in Fig. 2. The two partial slip-rings $d$ and D are disposed in diametrically opposed positions. The shaft $a$ is driven by a suitable motor (not shown).

The electrode $b$ and the partial slip-ring $d$ are insulated from the shaft $a$ but electrically connected together by an insulated wire $t$. The second partial slip-ring D is electrically connected to a complete slip-ring $f$ and by means of a brush through the wire $t'$ to the casing. The body of the commutator $w$, which carries the partial slip-rings $d$ and D, and the complete slip-ring $f$ consists of insulating material. When the switch $s$ is opened, according to Figure 1, the current may pass from the positive pole to the brush $e$ over the partial ring $d$, wire $t$, the electrode $b$, electrolyte $g$ and the counter-electrode $h$ through the casing to the wire $i$ and through the useful resistance $k$ to the negative pole.

If the switch is closed at $s'$, current then passes parallel to the above-described circuit from the positive pole over the switch $s'$ over the brush E, the slip-ring D, the complete slip-ring f, the brush, the wire t', the casing to the wire i through the useful resistance k to the negative pole.

In the diagram of connections shown in Figure 2, wherein the mechanical break-point d, e is connected with the electrolyte break-point g, b, h, in series, the circuit closing period of the break-point d, e lasts from the movement where the brush e comes in contact with the slip-ring d until the slip-ring d leaves the brush in the position e' indicated by dotted lines. Consequently, at a predetermined speed of rotation of the shaft, the circuit closing period is accurately determined and is invariable and depends on the length of the partial slip-ring contact d or on the centre angle included by the slip-ring d and on the dimensions of the brush.

At the second break-point b, g, h, the closing of the circuit begins in the position of the electrode b'' when the electrode dips in the electrolyte and lasts until the electrode b in the position b' emerges from the electrolyte. The circuit closing period is also always constant with an invariable level of the electrolyte and constant speed of rotation of the shaft a. Although the two break-points d, e, and b, g, h, individually have absolutely invariable circuit closing periods, yet it is possible to obtain a variable circuit closing period since the two invariable circuit closing periods are relatively displaceable one with respect to the other so that the actual circuit closure only occurs when the two break-points d, e, and b, g, h are simultaneously closed. This relative displacement of the two break-points connected in series is effected in a very simple manner by merely shifting the brush e on the holder 5 in the direction of rotation or opposite thereto by any well known means. When displacing the brush e relative to the slip-ring d, the circuit closing period at this break point remains always the same but the moment of the circuit closing period will be earlier if the brush is moved opposite to the direction of rotation of the shaft and later when the brush is moved in the opposite direction. It is thus possible to relatively displace the circuit closing periods of the two break-points d, e and b, g, h connected in series so that the duration of the resultant circuit closure is varied in connection with both break-points in series.

This shifting of the circuit closing period is shown diagrammatically in Figure 3. I indicates the circuit closing periods of the break-point b, g, h. II indicates the circuit closing periods of the break-point d, e and III indicates the resulting circuit closing period because a flow of the current can only take place when both series-connected break-points are closed. The point I$^b$ indicates the moment at which the electrode in its position b'' dips in the electrolyte and the point I$^a$ corresponds to the position in which the electrode b in its position b' emerges from the electrolyte g. The point II$^a$ represents the moment when the brush e is engaged by the slip ring d and the point II$^b$ indicates that position in which the brush e in its position e' is disengaged from the slip-ring d. In order to assure an absolutely sparkless breaking of the circuit, particularly with intense currents, it is necessary that the circuit interruption always occurs at the electrolyte break-point b, g, h, that is, the electrode b must emerge while the other break-point e, d, is still closed.

During the displacement of the brush, according to the diagram in Figure 3, the circuit closing periods of the break-point (I) and the periods of the break-point d, e (II) will be shifted so that the resulting effective circuit closing period III always increases as both break-points are simultaneously closed for a longer period. This is very clearly shown by Figure 3, wherein the circuit closing periods according to the time t increase gradually from III$^a$—III$^b$ to III$^{a'}$—III$^{b'}$.

The maximum circuit closing period, according to Fig. 3, occurs when the circuit closing period I is substantially coincident with the closing period II so that they approximately coincide, as is shown in Figure 3 on the right. In this case, the circuit closing period is approximately equal in length to the currentless period so that in this position the circuit is closed approximately half the time and open approximately the other half. If further lengthening of the circuit closing period is necessary, the switch s is shifted into the position s' whereby the partial slip-ring D will also be connected, this slip-ring D receives its current from the brush E and the latter is adjusted in such a manner that for one half revolution of the shaft a during the period IIA of Figure 3a it supplies the current over the ring T, wire t' the casing through the wire i to the useful resistance k. The contact DE invariably gives the circuit closure during the half period IIA. The remaining variation of one half to the full current intensity is again effected by the circuit e, d, t, b, g, h, above described. The connections of the circuit E, D, f, i, k are now adjusted by the position of the brush E so that the circuit remains closed during the first half of the period and the original circuit e, d, t, b, g, h, i, k forms the current path during the second half of the period, as previously described. The diagram (Fig. 3a) of the circuit closing period results therefrom. This circuit closing period IIA always lasts one half of the time and is supplementary to the period diagram of Fig. 3. As it is obvious from Fig. 3a, by adjustment of the brush e, the circuit closing periods III may be increased in duration as desired. The circuit closing period continues to increase until the circuit opening period terminates almost at the end of the second row.

When the invention is used for rectifying current, the slip-rings have a length of less than one-third of the periphery diminished by the double thickness of the brush and, as will be understood, the shaft a is rotated in synchronism with the frequency of the alternating current. The flow of current is broken between b and g so that when interrupting currents of a frequency of, for instance, 55 per second, no electric arc will appear. In this manner, either the positive or the negative wave of the alternating current may be suppressed.

Assuming that k is the useful load, the electrode b is set in rotation by a small motor. The brush e is then placed approximately at the point u of Fig. 2. The current is then switched on and owing to the position of the brush with respect to the slip ring d, the brush moves on to the slip ring at the moment when the electrode b emerges, that is to say, the circuit closing period is substantially at zero so that the useful load k receives only a small impulse. If the brush is now shifted clockwise from the position u, Fig. 2, the circuit closing period increases until the average current intensity has increased from zero to half the intensity when the circuit closing period is equal to the current interrupting period. At this point the switch S may be operated to switch on the slip ring D and the brush E and regulation of the current intensity may be effected by further adjustment of the brush e, the latter brush being again displaced with respect to its slip ring d as before. If it is desired to switch off the current, it is only necessary to disconnect the switch S and return the brush e to the initial position. The current passed with this adjustment of the apparatus is of such low value that the circuit may be finally interrupted without danger.

From the foregoing it will be understood that the regulation of the apparatus when used either as a rectifier or regulator is effected by suitable adjustment of the brush e.

I claim:

1. An interrupter for periodically breaking electric currents, comprising a rotatable metal to metal break point including a rotatable partial slip ring and an adjustable brush for said slip ring, and a metal to electrolyte break point including an electrode synchronously rotatable with the slip ring, and a series connection between the metal to metal break point and the metal to electrolyte break point.

2. An interrupter for periodically breaking electric currents, comprising a rotatable metal to metal break point including a rotatable partial slip ring and an adjustable brush for said slip ring, and a metal to electrolyte break point including an electrode synchronously rotatable with said slip ring and an electrolyte associated with said electrode, a series connection between the metal to metal and the metal to electrolyte break points, a second slip ring and brush, the second slip ring being synchronously rotatable with the first mentioned slip ring and electrode, and means for connecting the second mentioned slip ring and brush in parallel to the metal to electrolyte break point.

3. An interrupter for electric currents comprising a metal to metal break point and a metal to electrolyte break point, a common operating means for operating said break points in synchronism so that each of said break points is alternately opened and closed and means for varying the extent of overlap as between the closed condition of said metal to metal break point and the closed condition of said metal to electrolyte break point, and means for connecting said metal to metal break point and said metal to electrolyte break point in series.

4. The device of claim 3 including also a second metal to metal break point operated by said common operating means in synchronism with said metal to electrolyte break point and means for connecting said second metal to metal to said metal to electrolyte break point in parallel.

PAUL WANGEMANN.